(12) United States Patent
Kota et al.

(10) Patent No.: US 10,318,726 B2
(45) Date of Patent: Jun. 11, 2019

(54) SYSTEMS AND METHODS TO PROVIDE SECURITY TO ONE TIME PROGRAM DATA

(71) Applicant: QUALCOMM Incorporated, San Diego, CA (US)

(72) Inventors: Anil Kota, San Diego, CA (US); Sei Seung Yoon, San Diego, CA (US); Bhadri Kubendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 15/132,026

(22) Filed: Apr. 18, 2016

(65) Prior Publication Data

US 2017/0300251 A1     Oct. 19, 2017

(51) Int. Cl.
| G06F 21/55 | (2013.01) |
| G06F 21/64 | (2013.01) |
| G06F 3/06 | (2006.01) |
| G06F 11/10 | (2006.01) |
| G06F 11/263 | (2006.01) |
| G06F 21/78 | (2013.01) |
| G11C 17/14 | (2006.01) |

(52) U.S. Cl.
CPC .............. *G06F 21/55* (2013.01); *G06F 3/065* (2013.01); *G06F 3/0619* (2013.01); *G06F 3/0679* (2013.01); *G06F 11/108* (2013.01); *G06F 11/2635* (2013.01); *G06F 21/64* (2013.01); *G06F 21/78* (2013.01); *G11C 17/146* (2013.01)

(58) Field of Classification Search
CPC ................................ G06F 21/55; G06F 21/64
See application file for complete search history.

(56) References Cited

U.S. PATENT DOCUMENTS

| 6,320,818 | B1 * | 11/2001 | Matsubara | ............... G11C 7/06 365/230.08 |
| 6,426,893 | B1 | 7/2002 | Conley et al. | |
| 6,445,606 | B1 | 9/2002 | Khoury | |
| 6,707,696 | B1 * | 3/2004 | Turner | ..................... G11C 8/20 365/189.08 |
| 6,768,685 | B1 * | 7/2004 | Scheuerlein | ........... G11C 29/34 365/189.07 |
| 6,810,500 | B1 * | 10/2004 | Chang | ................. G06F 11/1012 348/441 |
| 7,623,378 | B1 | 11/2009 | Wahlstrom et al. | |
| 7,877,539 | B2 | 1/2011 | Sinclair et al. | |
| 8,526,210 | B2 | 9/2013 | Kim | |
| 8,908,464 | B2 | 12/2014 | Uvieghara et al. | |

(Continued)

OTHER PUBLICATIONS

International Search Report and Written Opinion—PCT/US2017/023056—ISA/EPO—dated Jun. 21, 2017.

*Primary Examiner* — Steve N Nguyen

(74) *Attorney, Agent, or Firm* — Haynes and Boone, LLP

(57) ABSTRACT

A method includes: reading a plurality of words from a one-time program (OTP) memory of a processing chip, wherein each of the words includes secure data for the chip and bits corresponding to a check pattern; comparing the bits corresponding to the check pattern to a preprogrammed check pattern; detecting an error based on comparing the bits corresponding to the check pattern to the preprogrammed check pattern; and performing an action by the processing chip in response to detecting the error.

11 Claims, 5 Drawing Sheets

(56) References Cited

U.S. PATENT DOCUMENTS

| | | | |
|---|---|---|---|
| 8,909,941 B1* | 12/2014 | Trimberger | G06F 21/64 |
| | | | 713/190 |
| 9,312,000 B1* | 4/2016 | Song | G11C 11/1655 |
| 2001/0044922 A1* | 11/2001 | La Rosa | G06F 11/1008 |
| | | | 714/800 |
| 2004/0114444 A1* | 6/2004 | Matsuoka | G11C 11/5678 |
| | | | 365/200 |
| 2005/0105366 A1* | 5/2005 | Pedlow, Jr. | G11C 17/18 |
| | | | 365/225.7 |
| 2007/0124647 A1* | 5/2007 | Chen | G06F 11/1068 |
| | | | 714/763 |
| 2007/0133316 A1* | 6/2007 | Maejima | G11C 16/24 |
| | | | 365/189.06 |
| 2009/0219749 A1* | 9/2009 | Lamorey | G11C 11/56 |
| | | | 365/148 |
| 2010/0103755 A1* | 4/2010 | Chen | G11C 7/12 |
| | | | 365/203 |
| 2014/0226426 A1 | 8/2014 | Uvieghara et al. | |
| 2014/0304520 A1* | 10/2014 | Bobzin | G06F 21/572 |
| | | | 713/187 |
| 2015/0134978 A1* | 5/2015 | Henry | G06F 21/572 |
| | | | 713/194 |
| 2015/0220457 A1 | 8/2015 | Katoh et al. | |
| 2015/0220736 A1* | 8/2015 | Martinez | G06F 13/24 |
| | | | 711/163 |

\* cited by examiner

SYSTEMS AND METHODS TO PROVIDE SECURITY TO ONE TIME PROGRAM DATA

TECHNICAL FIELD

This application relates to One Time Program (OTP) data and, more specifically, to providing security to OTP data.

BACKGROUND

A mobile computing device, such as a smart phone, contains a multi-processor chip to provide computing power. The multi-processor chip has secure data stored thereon in a One Time Program (OTP) memory. An example of an OTP memory includes an array of electronic fuses that can be programmed once by selectively blowing some of the fuses in the array. For example, a blown fuse may represent a binary one, and an un-blown fuse may represent a binary zero. These fuses may be blown only once and may not be repaired after being blown, so that the data stored by blowing the fuses is considered read-only after programming.

Continuing with the example, the secure data is read during power on or boot up of the chip. Examples of secure data that may be stored include hardware keys, boot read-only memory (ROM) patches, chip configuration information, and Original Equipment Manufacturer (OEM) information. Secure data is directly related to the desired functionality of the chip, and it is considered undesirable for the data to be tampered with. An example of a way to tamper with the data includes a hacker manipulating voltages on the chip to change a data readout or to manipulate control signals to the OTP memory.

One example conventional OTP memory module includes multiple rows and multiple columns. The topmost rows contain a pre-programmed check pattern of binary 0s and 1s. Below the pre-programmed check pattern rows are rows that have secure data. A firmware process reads the check pattern rows during power up to determine whether there is an attack, wherein it is assumed that an attack including lower voltages at the chip would result in the check pattern rows being read out incorrectly. In this manner, the firmware process can compare what it reads out to the known value of the check pattern, and if there is a mismatch, the firmware process may determine that there has been an attack on the OTP module. However, this method may be effective only during power up and may not block attacks once the chip is running and when the secure data is read out in real time.

There is currently a need for a more robust technique to protect secure OTP from a variety of attacks, including attacks that occur after boot-up.

SUMMARY

Various embodiments include systems and methods that protect secure OTP data from attacks by storing the OTP data in words that also include check pattern bits. An operation that reads the secure OTP data also reads the check pattern bits.

In one embodiment, a system includes a processing chip having a one-time program (OTP) memory portion, the OTP memory portion storing secure data and a check pattern, the secure data and the check pattern being stored within a plurality of words wherein each word includes secure data bits and check pattern bits; and a plurality of sense amplifiers, each of the sense amplifiers corresponding to a respective column of the OTP memory portion and each of the words corresponding to a respective row of the OTP memory portion.

In another embodiment, a method includes reading a plurality of words from a one-time program (OTP) memory of a processing chip, wherein each of the words includes secure data for the chip and bits corresponding to a check pattern; comparing the bits corresponding to the check pattern to a preprogrammed check pattern; detecting an error based on comparing the bits corresponding to the check pattern to the preprogrammed check pattern; and performing an action by the processing chip in response to detecting the error.

In another embodiment, a processing chip includes means for storing secure data and a check pattern in an array of one-time program (OTP) memory elements, the secure data and the check pattern being stored in the array of OTP memory elements as a plurality of words, wherein each word includes secure data bits and check pattern bits; and means for reading out the words from the OTP memory portion; and means for verifying the secure data by comparing check pattern bits of the read-out words to a preprogrammed pattern.

In yet another embodiment, a method includes: after a successful boot up of the processing chip, reading chip configuration data from a one-time program (OTP) memory module of the processing chip, wherein reading the chip configuration data includes reading a plurality of words from the OTP memory module, wherein each of the words includes bits corresponding to the configuration data and bits corresponding to a check pattern; determining that the bits corresponding to the check pattern are consistent with a preprogrammed pattern; and applying the chip configuration data in response to the determining

DETAILED DESCRIPTION

Figure 1:
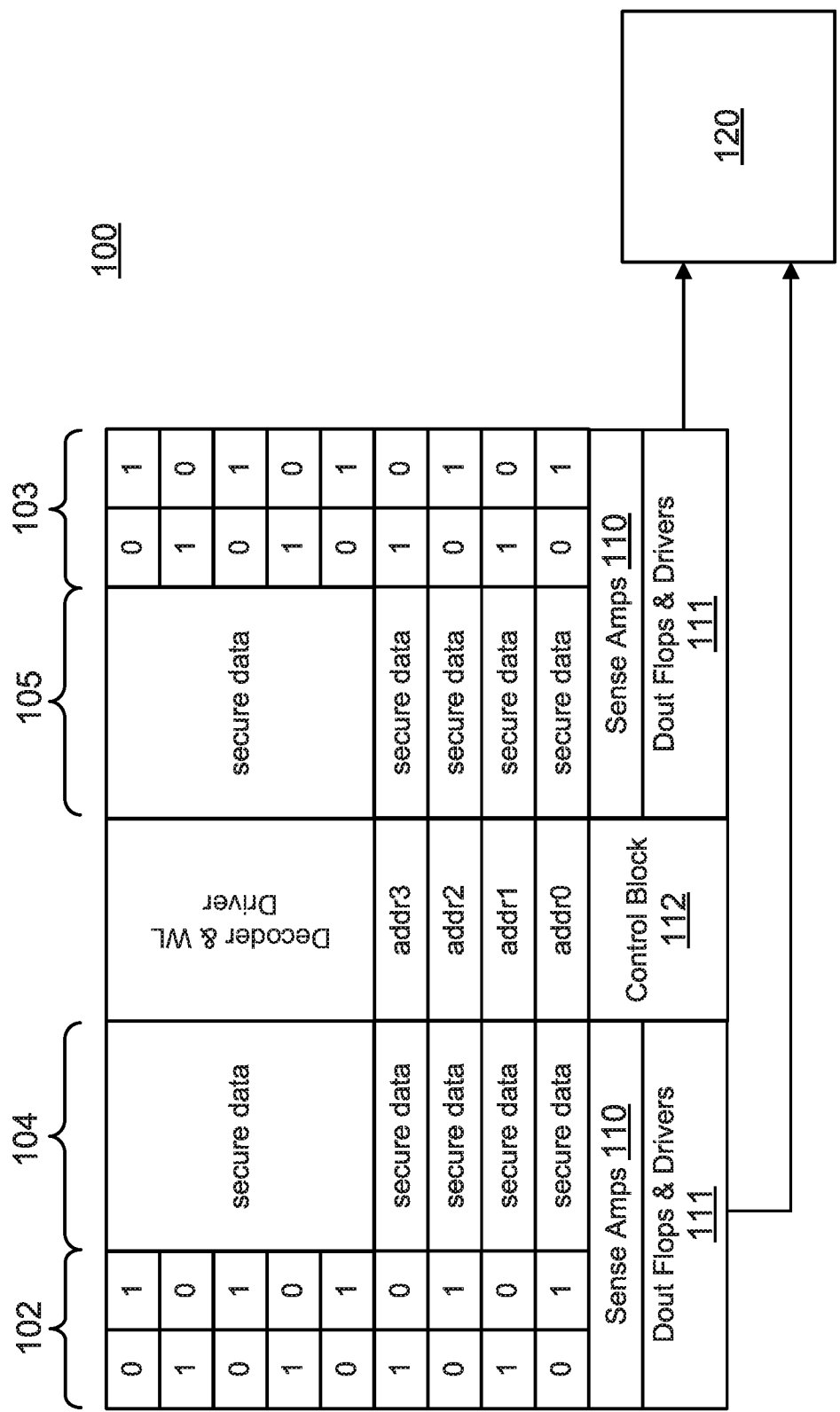
FIG. 1 is an illustration of an example OTP module according to various embodiments.

Various embodiments provide for systems and methods to securely store and access data in an OTP module. FIG. 1 shows an example embodiment having the preprogrammed check pattern of 1s and 0s written as columns in the OTP module. The firmware process reads out data from the OTP module on a row-by-row basis and reading a complete row at a time. In this example, a row is also referred to as a word. Therefore, when the firmware process accesses secure data in a row, it also accesses bits of the known check pattern at the beginning of the row and bits of the check pattern at the end of the row.

Or, put another way, the check pattern is embedded within the secure fuse data so that a reading of the secure fuse data includes bits of the check pattern. Some example embodiments ensure that accesses to the secure data also include bits of the check pattern whether the access occurs at boot up or after the chip starts running.

Various embodiments furthermore include ways to read out the data so that if bits in the OTP module fail, bits of the check pattern should fail first. This may be advantageous in some embodiments because it prevents an attacker from being able to successfully read out data when applying an undesirable voltage at the OTP module. A physical layout of an example OTP module is illustrated in FIG. 1.

Continuing with the example, the check pattern bits are accessed using the same control signals and power supply that are used to access the secure data. When a read signal comes in it is decoded at word line (WL) decoders, which apply a voltage to select a word line (a row). After a short amount of time, global control logic fires a sense amplifier enable signal to read a value at each of the columns. When reading the whole row, the control logic fires each of the sense amplifiers from the first column to the last column, capturing the read-out data in flip-flops, one flip-flop per bit.

Figure 2:
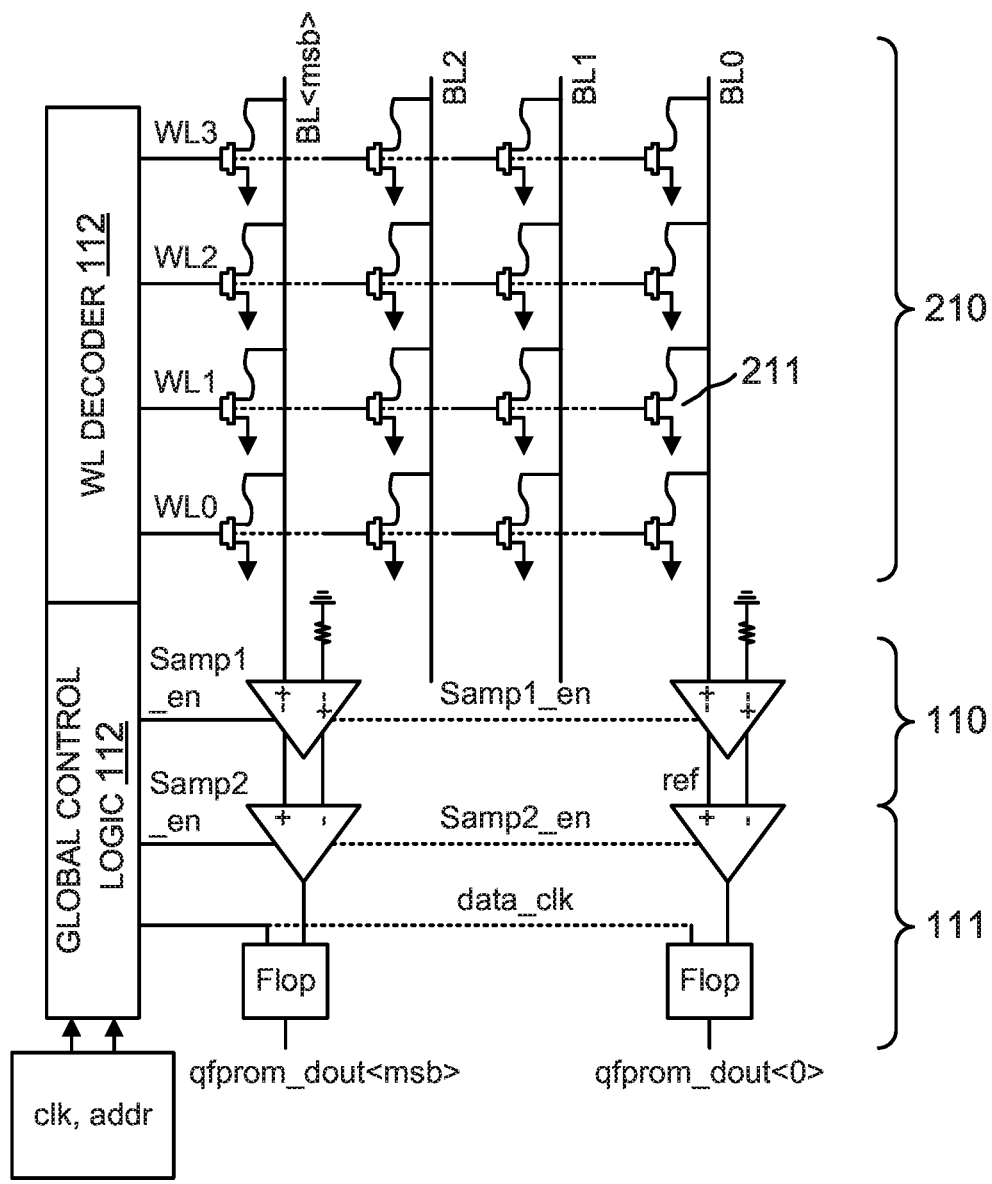
FIG. 2 is an illustration of an example physical architecture of the OTP module of FIG. 1, according to one embodiment.

Each of the sense amplifiers includes a data input and a reference input and acts as a comparator, outputting a binary 1 if the voltage is higher than a reference and a binary 0 if the voltage is lower than the reference. This is how the data in an example OTP module is read, and one advantage is that an attack affecting control signals will generally be expected to affect each of the bits in a similar manner, thereby making it difficult to affect the secure data bits without affecting the check pattern bits. FIG. 2 illustrates this concept in more detail.

Various embodiments make read failures of the check pattern bits more likely than read failures of the secure data bits by tightening the margins when reading the check pattern bits. Such embodiments may include circuits allowing for selectable resistances at the sense amplifiers, where a resistance is selected based on an address of the row that is currently being read. The control block examines the address of a row being read and in response to the address selects a resistance that tightens a margin to read either a one or a zero in the check pattern. An advantage of such embodiments is that a read failure is more likely to be detected since it is generally expected to affect check pattern bits, whereas by contrast the read failure affecting secure data but not check pattern bits might go undetected and cause less than optimal operation of the device.

FIG. 1 is a simplified diagram illustrating an example OTP module 100 in which various embodiments may be implemented. OTP module 100 is shown in FIG. 1 by itself, but it is understood that may be included in a processing device, such as a central processing unit (CPU), digital signal processor (DSP), a system on chip (SOC) having multiple processing cores on a chip, a package including multiple chips, and/or the like.

According to examples herein, the processing device in which OTP module 100 is implemented may include a tablet computer, a smart phone, or other appropriate device. However, the scope of embodiments is not limited to a smart phone or tablet computer, as other embodiments may include a laptop computer or other appropriate device. In fact, the scope of embodiments includes any particular computing device, whether mobile or not.

OTP module 100 is shown having an array of memory elements arranged in rows and columns. For ease of illustration, the columns are noted as subsets, where subsets 102 and 103 include a check pattern, and subsets 104 and 105 include secure data. Each row is a word that can be read out of OTP module 100 under the direction of control block 112.

Examples of secure data may include, but are not limited to configuration information for the processing device, hardware keys for the processing device, boot ROM patches, OEM manufacturer information, and the like. Secure data is generally data that is included by the manufacturer of the processing device or a manufacturer of a computer into which the processing device is implemented, and the secure data is usually only read by underlying processes within the processing device and is not intended to be accessible by an end-user. Secure data may or may not be encrypted.

The check pattern itself is shown in this example as a repeating pattern of ones and zeros, and the pattern in each row is offset from its adjacent rows. Specifically, in column 103, a given row may have a binary zero followed by a binary one, and the row adjacent and below it has a binary one followed by binary zero. This creates an alternating pattern with an offset row by row. Of course, the scope of embodiments is not limited to the specific pattern shown in FIG. 1, as any appropriate pattern may be applied in various embodiments. It is generally advantageous to have a pattern that includes both binary ones and binary zeros to more comprehensively detect attacks.

The secure data and the check pattern are saved in the OTP module 100 using fuses. For example, a blown fuse creates high resistance and may be read as a binary one, where as a fuse that is not blown may have a low resistance and is read as a binary zero. However, the scope of embodiments may include a system in which a blown fuse is read as a binary zero, and a fuse that is not blown is read as a binary one. Furthermore, the scope of embodiments is not limited to fuses, as other appropriate memory elements may be used. Other examples include anti-fuses and nonvolatile RAM.

Of particular note in FIG. 1 is that the bits of the check pattern are included in the same words as the secure data. Therefore, an operation that reads a word from OTP module 100 will necessarily read four bits of the check pattern along with the bits of the secure data. Although FIG. 1 is shown in a conceptual and high-level manner, the structure of FIG. 1 is indicative of the physical structure of various embodiments—rows and columns of memory elements, each memory elements storing a bit of data, where the data is read out in rows (words).

OTP module 100 also includes sense amplifiers 110, which operate to read the data stored in the memory elements, as explained in more detail below. OTP module 100 includes flip-flops and drivers 111 to capture the data that is read out, as explained in more detail below.

Control block 112 includes firmware logic to decode read requests, apply control signals to the word lines, bit lines, sense amplifiers, and flip-flops, as explained in more detail below. Verification logic 120 includes firmware and/or software logic that receives the words as they are read out from OTP module 100, compares the bits of the check pattern to a preprogrammed pattern, and either indicates an error or does not indicate an error based on the comparison. For example, a mismatch between the bits of the check pattern and the preprogrammed pattern at verification logic 120 may indicate an attack, and verification logic may therefore indicate an error. On the other hand, if the bits of the check pattern match the bits of the preprogrammed pattern at verification logic, 120 then verification logic 120 may verify the contents of OTP module 100 according to normal operation. In some embodiments, verification logic 120 sends signals to control block 112 to request particular words stored by OTP module 100.

Some conventional OTP modules operate only at boot up. However, OTP module 100 in FIG. 1 is particularly suited to use during boot up or during any other appropriate time because the bits of the check pattern are read out whenever the secure data is read out. Therefore, a request for secure fuse data even after a successful boot up will read bits of the check pattern as well.

FIG. 2 is a more detailed illustration of OTP module 100 of FIG. 1, according to one embodiment. Memory element array 210 is shown including fuses (e.g., fuse 211) that act as memory elements, and array 210 is arranged in columns and rows. FIG. 2 is intended to be illustrative, and it omits some features for ease of illustration. For instance, various embodiments may include any appropriate number of columns, such as thirty-two columns or sixty-four columns, but FIG. 2 omits a multitude of columns for ease of illustration. Furthermore, various embodiments may include any appropriate number of rows, whereas FIG. 2 shows four rows for ease of illustration.

The columns of memory elements in the array 210 correspond to the columns of data in FIG. 1, although FIG. 2 shows fewer columns. Similarly, the rows of memory elements in the array 210 correspond to the rows of data in FIG. 1. Each column is associated with a sense amplifier, where FIG. 2 shows two sense amplifiers 110. FIG. 2 omits a multitude of sense amplifiers for ease of illustration. Sense amplifiers 110 share a common enable signal (samp1_en), which is provided by global control logic which is part of control block 112.

Sense amplifiers 110 act as comparators by receiving a signal at a particular voltage level from a respective column. A given sense amplifier includes an input to receive the signal from its respective column as well as an input to receive a reference voltage. A sense amplifier compares the signal from the column to the reference voltage and outputs either a high or low voltage value in response thereto. For instance, if the voltage signal received from the column is lower than the reference voltage, then the sense amplifier may output a low voltage. On the other hand, if the voltage signal received from the column is higher than the reference voltage, then the sense amplifier may output a high voltage. A given sense amplifier performs the comparison when it receives the enable signal (samp1_en).

The flip-flops and drivers 111 are also implemented on a per-column basis, so that each column corresponds to a sense amplifier, a driver, and a flip-flop. FIG. 2 shows two of each for ease of illustration. The output of a given sense amplifier is received by a driver, which applies gain to the signal received from its respective sense amplifier so that the high signal (in the event of reading a binary one) is high enough to be read by the respective flip-flop. The drivers share a common enable signal (samp2_en). The flip-flops capture the data and output them according to the clock (data_clk). The output (the read data) includes a string of binary bits from a most significant bit (<msb>) to a least significant bit (<0>).

In this example, the columns are referred to as bit lines, and the rows are referred to as word lines. Each of the bit lines is associated with a common power supply (not shown).

Control block 112 receives control signals including a clock (clk) and a row address signal (addr). Control block 112 may pass the clock signal to the flip-flops either unmodified or in some modified form as data_clk. Control block 112 uses the row address signal to access a particular word of data.

In the present example, operation of OTP module 100 usually begins by receiving the row address signal. In response, the word line decoders select an appropriate word from the array 210. Word line decoders apply a voltage to the particular word line (WLx) that is indicated by the row address signal. There is usually some amount of delay to allow the voltage at the sense amplifier inputs from the columns to rise to a level that the signals can be captured reliably. Each of the sense amplifiers receives a voltage that corresponds to a particular memory cell that is selected in its respective column. For example, as mentioned above, a blown fuse may cause a high voltage, and an un-blown fuse may cause a low voltage.

After the delay, control block 112 fires the enable signals samp1_en and samp2_en to cause the comparators to determine ones and zeros and to cause the drivers to amplify the outputs of the comparators. The flip-flops capture the data from the drivers. In this embodiment, each of the sense amplifiers and drivers are enabled at the same time, thereby reading an entire word at one time. The system may read subsequent words by selecting a different address.

Of note in the embodiment of FIG. 2, the bit lines receive the same voltage, and the sense amplifier enable signal samp1_en is a common enable signal applied to each of the sense amplifiers. Therefore, an attack aimed at OTP module 100 by modifying a voltage would affect the voltages in the columns storing the check pattern as well as the columns storing the secure data. It is expected that such manipulation would result in a mismatch of the check pattern when it is compared by verification logic 120. The same is true for the driver enable signal, samp2_en. Furthermore, the flip-flops share a common clock, so that manipulations of the clock would affect flip-flops that capture bits of the check pattern as well as flip flops that capture bits of secure data. OTP module 100 of FIG. 2 uses global control signals (data_clk, samp1_en, samp2_en) and a common power supply for the bit lines so that manipulation of power or control affects check pattern bits as well as secure data bits. Verification logic 120 may then detect the error when it compares the read-out bits of the check pattern with its preprogrammed pattern.

It is generally expected that the fuses in the array 210 may experience a process, temperature, voltage (PVT) variation, thereby deviating from the ideal by some extent. It is also generally considered desirable that PVT variation would cause a misread of a check pattern bit before it would cause a misread of a bit of secure data. Such feature allows the system to reject errors. Various embodiments herein dynamically adjust the reference voltages of the sense amplifiers that read check pattern bits in order to narrow the read margins.

Figure 3:
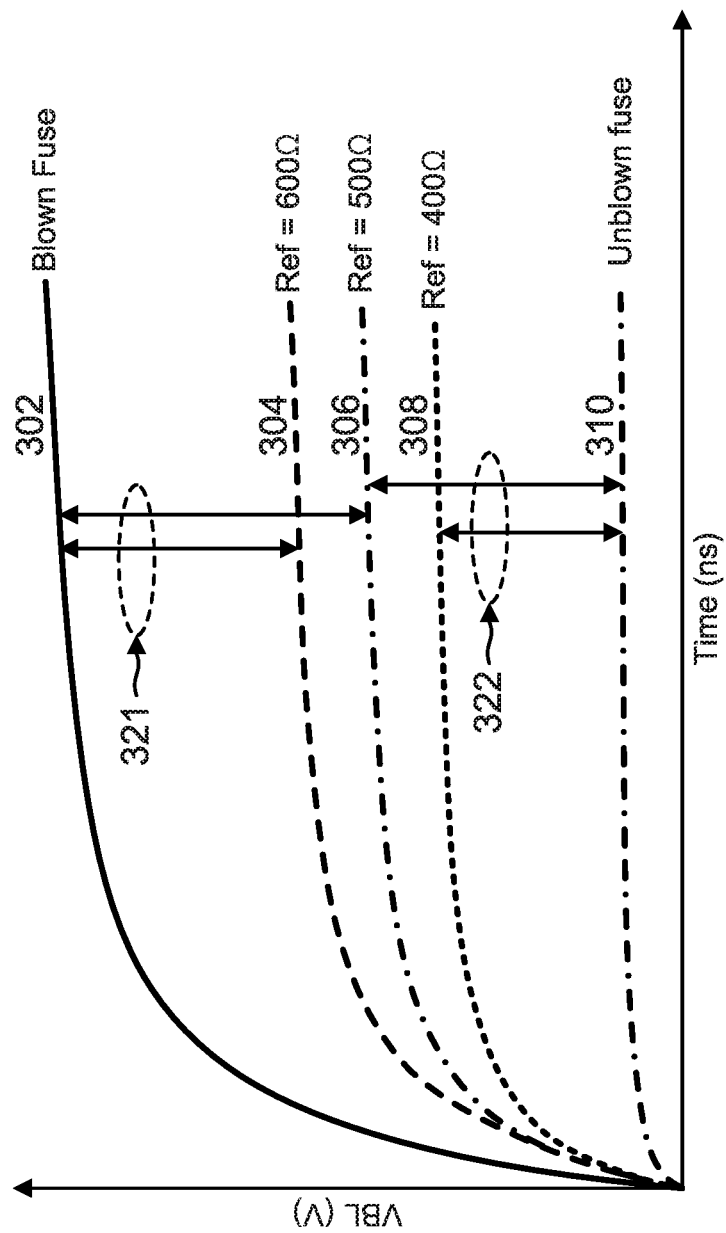
FIG. 3 is an illustration of read margin adjustment, according to one embodiment.

FIG. 3 provides the graph illustrating read margins and a process for narrowing a read margin, according to one embodiment. In the graph of FIG. 3, a blown fuse is associated with a binary one (a high voltage), and an unblown fuse is associated with a binary zero (a low voltage). The x-axis of FIG. 3 is time, and the y-axis is bit line voltage as seen by a sense amplifier. FIG. 3 illustrates that there is some amount of delay for a voltage to rise to a level of a high voltage. This is explained above with respect to FIG. 2 and the delay before enabling the sense amplifiers and drivers.

Between the high voltage curve 302 of the blown fuse and the low voltage curve 310 of the unblown fuse, there are three curves 304-308 that are associated with reference voltages that may be applied to the sense amplifiers 110 of FIG. 2. When reading a bit of secure data, a reference voltage may be set halfway between a high voltage and a low voltage. The sense amplifier acts as a comparator and outputs a high voltage if the input voltage is higher than the reference voltage or outputs a low voltage of the input voltage is lower than the reference voltage.

Each of the sense amplifiers has a resistance applied at its reference input, where the resistance determines the reference voltage at that sense amplifier. In this example, each of the reference voltage curves 304-308 are associated with a particular resistance—600 ohms, 500 ohms, or 400 ohms. Curve 306 is associated with 500 ohms. A higher resistance applied at the reference input would raise the reference voltage slightly, and a lower resistance applied at the reference input would lower the reference voltage slightly. For purposes of this example, a resistance of 500 ohms is assumed to produce curve 306 in the middle, resulting in approximately equal read margins for both a binary zero in a binary one. Increasing the resistance applied at the reference input to 600 ohms would increase the reference voltage slightly, thereby decreasing the margin for reading a binary one and increasing a margin for reading a binary zero. Similarly, decreasing the resistance applied at the reference input to 400 ohms would decrease the margin for reading a binary zero and increase the margin for reading a binary one. Margins for reading a binary 1 are shown as items 321, and margins for reading a binary zero are shown as items 322.

Of course, the scope of embodiments is not limited to any specific resistance or reference voltage applied at a reference voltage input of a sense amplifier 110. In fact, in various embodiments, an appropriate resistance at the reference input of the sense amplifiers 110 may be determined during a design stage based on various factors, including an amount of resistance expected from an unblown fuse or a blown fuse and a voltage level of the power supply of the bit lines.

Various embodiments may selectively change a resistance at a reference input based on an address being read in order to reduce a read margin for the bits of the check pattern. In FIG. 1, the check pattern alternates between a binary one and a binary zero and is offset row by row. Accordingly, a given sense amplifier may be used to measure either a binary one or a binary zero, depending upon the address of the word being read.

Figure 4:
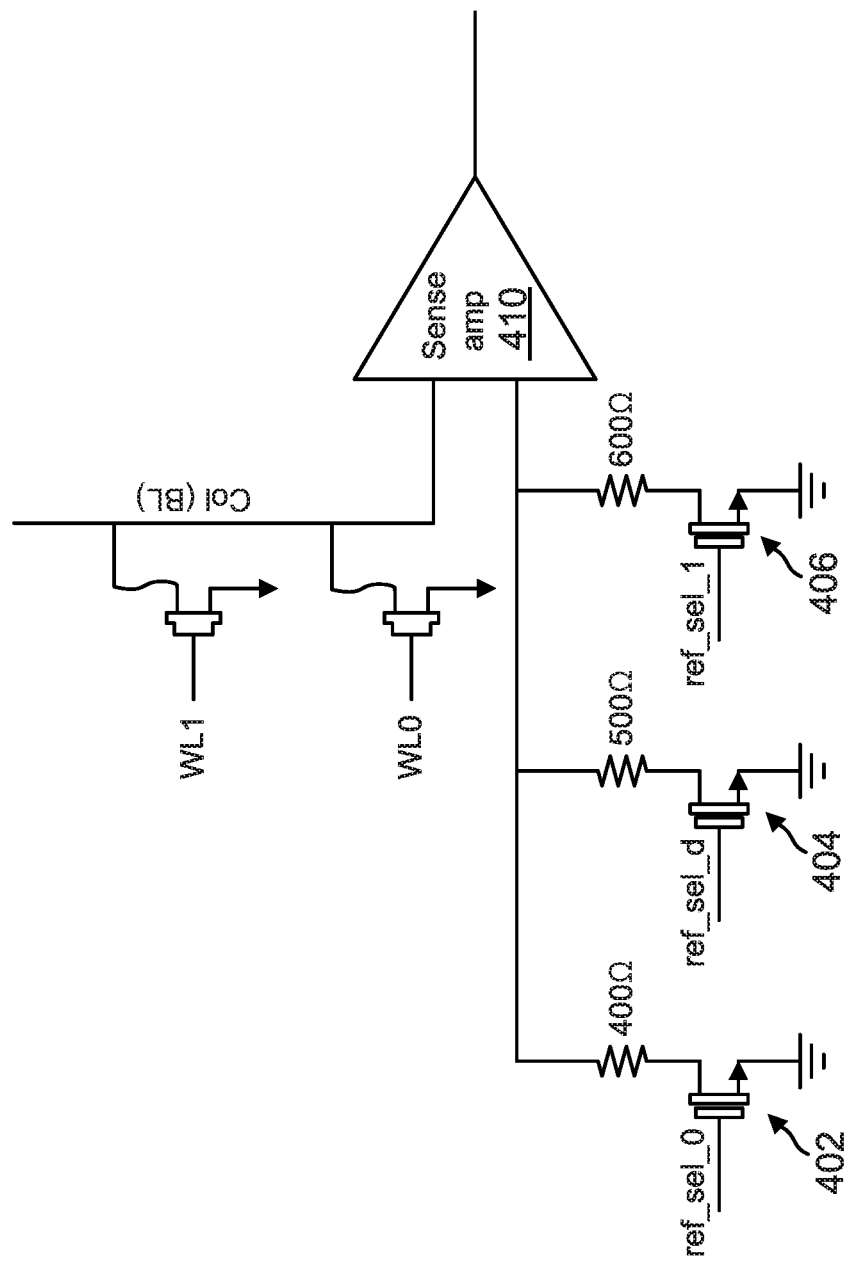
FIG. 4 is an illustration of an example circuit to adjust to read margins, adapted according to one embodiment.

FIG. 4 is an illustration of an example sense amplifier 410 for use in the architecture of FIG. 2, according to one embodiment. The embodiment of FIG. 4 includes three transistors—402, 404, 406. Transistor 402 is associated with a 400 ohm resistor; transistor 404 is associated with a 500 ohm resistor, and transistor 406 is associated with a 600 ohm resistor. Each of the transistors 402-406 receives a respective gate control voltage ref_sel_0, ref_sel_d, or ref_sel_1. Control block 112 applies a resistance at the reference input of the sense amplifier 410 by generating a high signal for one of the gate control voltages and holding the gates of the other transistors at a low voltage. For instance, control block 112 may apply a 400 ohm resistance at the reference input of sense amplifier 410 by applying a high voltage at gate control voltage ref_sel_0 and a low voltage at the other two gates. Similarly, control block 112 may apply a 500 ohm resistance at the reference input by applying a high voltage at gate control voltage ref_sel_d, and control block 112 may apply a 600 ohm resistance by applying a high voltage at gate control voltage ref_sel_1.

In one particular example, a given row may include 0101 as its check pattern bits. Further in this example, it is assumed that sense amplifier 410 is one of four sense amplifiers reading the check pattern bits, and sense amplifier 410 reads the first bit (0 for this row). When control block 112 receives the address signal (addr) selecting that given row, it can use the least significant bit of the address signal to know whether the row has 0101 or 1010 as its check pattern bits. Accordingly, control block 112 reads the least significant bit of the address signal and knows that sense amplifier 410 is expected to read a binary zero. Therefore, control block 112 applies a high voltage to the gate of transistor 402 to decrease the read margin of the binary zero.

An adjacent row would have 1010 is its check pattern bits, and control block 112 would read the least significant bit of the address signal to then know that the sense amplifier 410 would be expected to read a binary one. Therefore, control block 112 would apply a high voltage to the gate of transistor 406 to decrease the read margin of the binary one. Accordingly, control block 112 may use a technique such as this to decrease the read margins of the bits of the check pattern based on an address being read. Sense amplifier 410 may be embodied as a relatively simple operational amplifier (op amp), with the reference resistances in communication with its "−" input and the respective bit line in communication with its "+" input. However, the scope of embodiments is not limited to any particular sense amplifier structure.

Sense amplifier 410 of FIG. 4 is shown with three transistors 402, 404, 406 and may therefore provide three selectable resistances at the reference input. The above example uses only two of the selectable resistances. However various embodiments may include calibration to account for variation. Specifically, a resistance value of a blown fuse may vary somewhat, and the present embodiment can apply calibration to match selectable resistances with known variations between resistance of a blown fuse resistance of an unblown fuses. If there is a greater difference between the resistance of a blown fuse and an unblown fuse, the calibration step may determine that it is better to switch between transistors 404 and 406 rather than 402 and 406. Various embodiments may use a similar structure to read secure data as well, using calibration to determine an appropriate resistance value for a reference input.

Various embodiments may provide one or more advantages over conventional techniques. The examples described above with respect to FIGS. 1 and 2 provide an extra level of security to the system by ensuring that reads of word lines of the OTP module 100 include bits of the check pattern as well. If the data is read and then output to a verification circuit, such as verification logic 120, the verification circuit may then catch errors and disallow the manipulation of secure data. Furthermore, the embodiments of FIGS. 3 and 4 may tighten the read margins of bits of the check pattern in order to make it more likely that check pattern bits would fail before secure data bits would fail, thereby decreasing the likelihood that manipulated secure data would ever be read.

Figure 5:
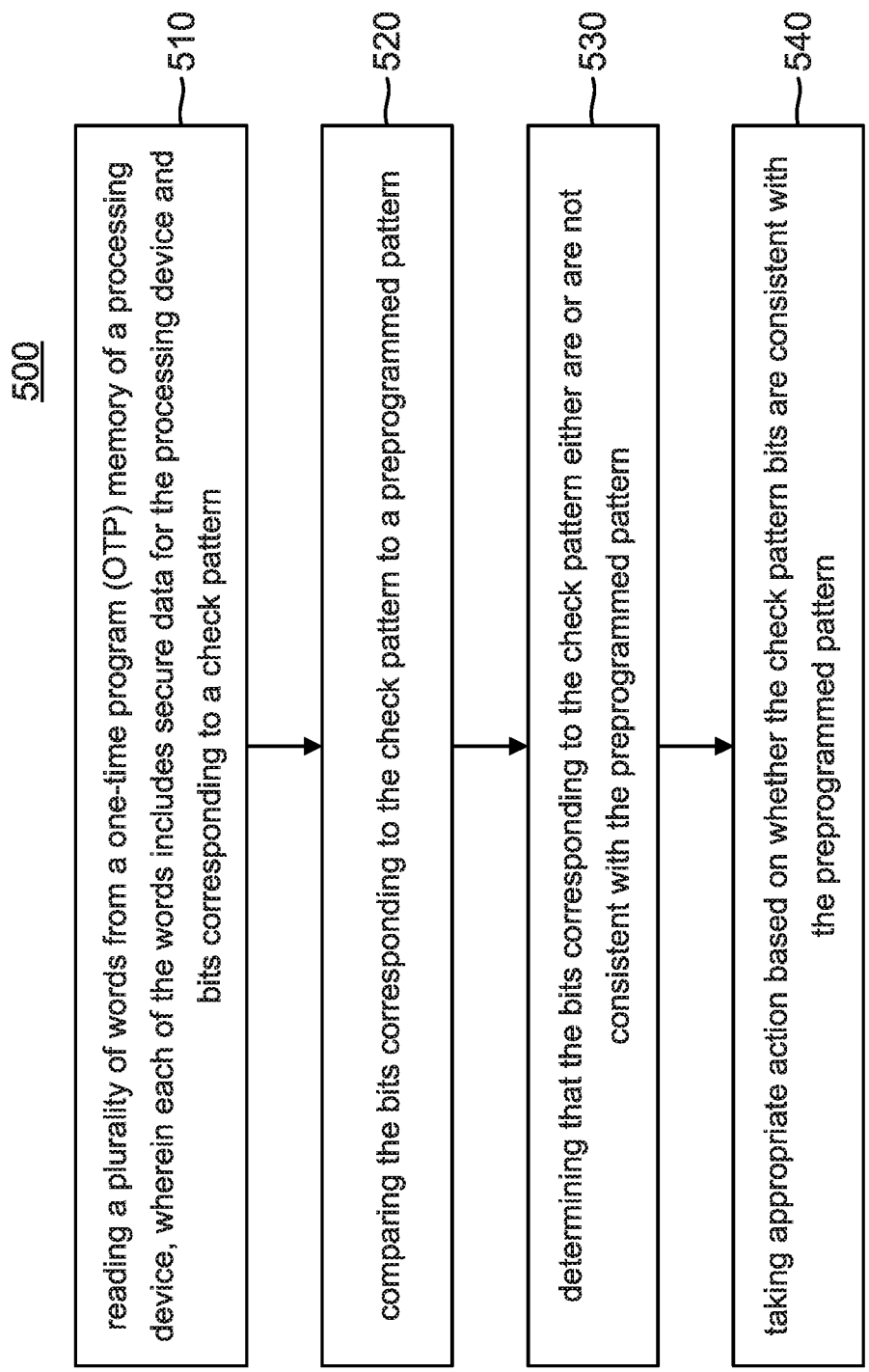
FIG. 5 is an illustration of a flow diagram of an example method of reading data from an OTP module, according to one embodiment.

A flow diagram of an example method 500 of reading secure data from an OTP memory is illustrated in FIG. 5. In one example, method 500 is performed by control block 112 and verification logic 120 FIG. 1. Method 500 may be performed at boot up of the processing device, subsequent to a successful boot up of the processing device, or any other time. In other words, method 500 is not limited to being performed at boot up of the device.

At action 510, the verification logic reads a plurality of words from an OTP memory of a processing device. An example is shown at FIG. 1, where verification logic 120 reads words from OTP module 100. Furthermore at action 510, each of the words includes secure data for the processing device and bits corresponding to a check pattern. Examples are shown at FIG. 1, wherein each row of OTP module 100 includes four columns of the check pattern. Two columns are at the beginning of the rows, and the other two columns are at the end of the rows, thereby ensuring that a read of any word results in reading bits of the check pattern.

Reading the plurality of words from the OTP memory may include further actions as well. As shown with respect to FIG. 2, control block 112 decodes address signals, the sense amplifiers share a common enable signal, and the flip-flops share a common clock signal. Action 510 may further include selecting a reference voltage at sense amplifiers that read check pattern bits, as explained further above with respect to FIGS. 3 and 4.

At action 520, the verification logic compares the bits corresponding to the check pattern to a preprogrammed pattern. For instance, the verification logic may store a pattern in its own memory to which it compares the read-out check pattern bits.

At action 530, the verification logic determines that the bits corresponding to the check pattern either are or are not consistent with the preprogrammed pattern. If the bits do not match, that may be an indication of an error or an attack. On the other hand, if the bits do match, that may be an indication that there is no attack or that there is no error.

At action 540, the system takes appropriate action based on the outcome of the determining at step 530. For instance, if the bits do not match at action 530, then the verification logic may flag the data for potential error, issue an interrupt to the processor device, stall hardware, prevent a boot up or other process, or other appropriate action. In fact, the scope of embodiments is not limited to any particular action in response to detecting a possible error.

On the other hand, if the bits do match at action 530, then the verification logic may allow operation to proceed uninterrupted or as normal.

The scope of embodiments is not limited to the specific method shown in FIG. 5. Other embodiments may add, omit, rearrange, or modify one or more actions. For instance, method 500 may performed multiple times beginning at boot up of the processing device and then performed subsequent times during operation of the processing device.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A system comprising:
a processing chip having:
a one-time program (OTP) memory portion, the OTP memory portion storing secure data and a check pattern, the secure data and the check pattern being stored within a plurality of words wherein each word includes secure data bits and check pattern bits in a respective row of memory elements of the OTP memory portion;
a plurality of sense amplifiers, each of the sense amplifiers corresponding to a respective column of the OTP memory portion and each of the words corresponding to a respective row of the OTP memory portion, wherein the plurality of sense amplifiers comprises a subset of the sense amplifiers, wherein each sense amplifier of the subset of sense amplifiers includes a plurality of selectable reference resistances coupled to an inverting amplifier input; and
a control block configured to select ones of the selectable reference resistances, wherein the OTP memory portion is arranged in a plurality of rows and columns, further wherein the check pattern is stored in a beginning column and an ending column for each of the plurality of rows of the OTP memory portion and includes an alternating pattern of binary ones and zeros offset row by row.

2. The system of claim 1, wherein the OTP memory portion comprises a fuse memory array.

3. The system of claim 1, wherein a first subset of the columns of the OTP memory portion stores the check pattern, and wherein a second subset of the columns of the OTP memory portion stores the secure data; and
a plurality of enable inputs at the sense amplifiers, the enable inputs in communication with a common enable signal.

4. The system of claim 1, wherein a first subset of the columns of the OTP memory portion stores the check pattern, and wherein a second subset of the columns of the OTP memory portion stores the secure data; and the system further comprises
a plurality of flip-flops configured to capture data from respective ones of the sense amplifiers, wherein the flip-flops share a common clock signal.

5. The system of claim 1, wherein the OTP memory portion comprises:
a plurality of the memory elements arranged in word lines and bit lines, wherein the bit lines share a common power supply.

6. The system of claim 1, wherein the secure data comprises at least one of:
configuration data for the processing chip;
hardware keys for the processing chip,
boot read-only memory (ROM) patches; and
manufacturer information.

7. A processing chip comprising:
an array of one-time program (OTP) memory elements configured to store secure data and a check pattern, the secure data and the check pattern being stored in the array of OTP memory elements as a plurality of words, wherein each word includes secure data bits and check pattern bits in a respective row of memory elements of the OTP memory portion;
means for reading out the words from the OTP memory portion; and
means for verifying the secure data by comparing check pattern bits of the read-out words to a preprogrammed pattern, wherein the means for reading out the words comprises:
a plurality of sense amplifiers, each of the sense amplifiers corresponding to a respective column of the array of OTP memory elements, a subset of the sense amplifiers having a plurality of selectable reference resistances coupled to respective inverting amplifier inputs; and
means for selecting ones of the selectable reference resistances, wherein the OTP memory elements are arranged in a plurality of rows and columns, wherein each word corresponds to a row of the array of OTP memory elements, further wherein the check pattern is stored in a beginning column and an ending column for each of the plurality of rows of the array of OTP memory elements and includes an alternating pattern of binary ones and zeros offset row by row.

8. The processing chip of claim 7, wherein the means for reading out the words comprises means for selecting words from the array of OTP memory elements including decoding an address signal, the address signal identifying word lines of the array of OTP memory elements.

9. The processing chip of claim 7, wherein the OTP memory elements comprise fuse elements.

10. The processing chip of claim 7, wherein a first subset of the columns stores the check pattern, and wherein a second subset of the columns stores the secure data, the means for reading out the words further comprising:
   a plurality of enable inputs at the sense amplifiers, the enable inputs configured to receive a common enable signal.

11. The processing chip of claim 7, wherein a first subset of the columns stores the check pattern, and wherein a second subset of the columns stores the secure data, the means for reading out the words further comprising:
   a plurality of flip-flops configured to capture data from respective ones of the sense amplifiers, wherein the flip-flops share a common clock signal.

* * * * *